(12) United States Patent
Nakata (10) Patent No.: US 8,582,093 B2
(45) Date of Patent: Nov. 12, 2013

(54) SIGNAL LIGHT MONITORING APPARATUS AND SIGNAL LIGHT MONITORING METHOD

(75) Inventor: Takeshi Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 81 days.

(21) Appl. No.: 13/225,881

(22) Filed: Sep. 6, 2011

(65) Prior Publication Data

US 2012/0057151 A1  Mar. 8, 2012

(30) Foreign Application Priority Data

Sep. 7, 2010  (JP) ............................. P2010-200008

(51) Int. Cl.
*G01J 1/42* (2006.01)
(52) U.S. Cl.
USPC ........................................................ 356/225
(58) Field of Classification Search
USPC ....................................................... 356/225
See application file for complete search history.

(56) References Cited

U.S. PATENT DOCUMENTS

2003/0184838 A1*  10/2003  Akiyama et al. ............... 359/239
2007/0065162 A1*  3/2007  Kikuchi ......................... 398/208

FOREIGN PATENT DOCUMENTS

WO  2004095740 A  11/2004

* cited by examiner

*Primary Examiner* — Tu Nguyen (57) ABSTRACT

An optical filter performs filtering on input monitor light in a transmission range having a carrier frequency of each channel being measured as a center frequency. Photoelectric convertors convert the monitor light filtered by the optical filter into an electrical monitor signal, and the signal detection unit judges whether signal light is present or absent based on the electrical monitor signal. Since the optical filter performs filtering, an S/N ratio of the monitor light becomes great and the signal detection unit can more accurately judge whether signal light is present or absent even in an optically noisy environment.

9 Claims, 9 Drawing Sheets

SIGNAL LIGHT MONITORING APPARATUS AND SIGNAL LIGHT MONITORING METHOD

Priority is claimed on Japanese Patent Application No. 2010-200008, filed Sep. 7, 2010, the content of which is incorporated herein by reference.

BACKGROUND OF THE INVENTION

1. Field of the Invention

The present invention relates to a signal light monitoring apparatus and a signal light monitoring method of judging whether signal light is present or absent in optical communication.

2. Description of Related Art

In optical communication, one method of judging whether signal light is present or absent is a method of judging whether signal light is present or absent based on whether a communication apparatus is successful at restoring data from input light.

For example, a communication apparatus (a light reception apparatus) that limits a band of input signal light, converts the band-limited signal light into an electrical signal, and performs an equalization process on the electrical signal is disclosed in a Pamphlet of International Publication No 2004/095740 (Patent Document 1). Since this communication apparatus limits the band of the input signal light, the communication apparatus can restore communication data even when an S/N ratio (Signal-To-Noise Ratio) is relatively small. When the communication apparatus is successful at restoring the communication data, the communication apparatus judges that the communication apparatus is receiving signal light.

However, the communication apparatus in Patent Document 1 does not have a judgment means for judging whether the communication apparatus is successful at restoring data, and cannot judge whether the communication apparatus is successful at restoring data or whether signal light is present or absent. Thereby, it is necessary for a user to judge whether the communication apparatus is successful at restoring data and whether the signal light is present or absent.

In order to restore the communication data, an S/N ratio equal to or more than a certain value so that a code error is not generated is necessary. Thereby, the communication apparatus in Patent Document 1 cannot restore the communication data and the user cannot accurately judge whether the signal light is present or absent in an optically noisy environment. Further, a degree of limitation of the band of the input light in the communication apparatus in Patent Document 1 is limited to a degree allowing a communication symbol to be decoded from signal light. Accordingly, improvement of the S/N ratio using the band limitation is limited. In this point, the communication apparatus in Patent Document 1 cannot accurately judge whether signal light is present or absent in an optically noisy environment.

SUMMARY OF THE INVENTION

The present invention has been invented in view of the foregoing circumstances, and an object of the present invention is to provide a signal light monitoring apparatus and a signal light monitoring method capable of more accurately judging whether signal light is present or absent even in an optically noisy environment.

To accomplish the foregoing object, a signal light monitoring apparatus according to an aspect of the present invention includes: an optical filter for extracting light in a band having a carrier frequency of signal light, which is a measurement object, as a center frequency from input light; and a signal presence/absence judgment unit configured to judge whether a signal is present or absent based on intensity of the light extracted by the optical filter.

Further, a signal light monitoring method according to an aspect of the present invention is a signal light monitoring method for a signal light monitoring apparatus, the method including: an optical filtering step of extracting, by an optical filter, light in a band having a carrier frequency of signal light, which is a measurement object, as a center frequency from input light; and a signal presence/absence judgment step of judging, by a signal presence/absence judgment unit, whether a signal is present or absent based on intensity of the light extracted by the optical filter.

According to the present invention, it is possible to more accurately judge whether signal light is present or absent even in an optically noisy environment.

DETAILED DESCRIPTION OF THE INVENTION

Hereinafter, an embodiment of the present invention will be described with reference to the accompanying drawings.

Figure 1:
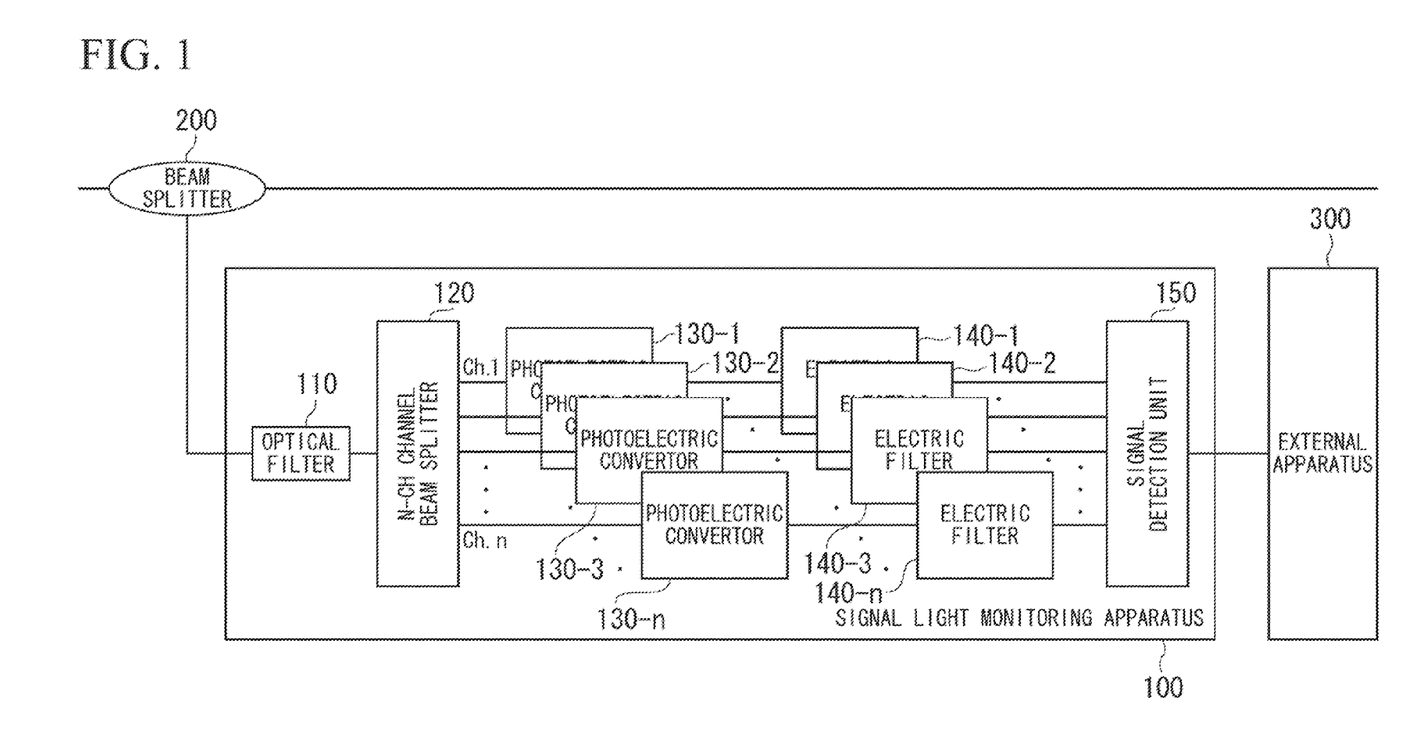
FIG. 1 is a configuration diagram showing a schematic configuration of a signal light monitoring apparatus in an embodiment of the present invention.

FIG. 1 is a configuration diagram showing a schematic configuration of a signal light monitoring apparatus in an embodiment of the present invention. In FIG. 1, a signal light monitoring apparatus 100 includes an optical filter 110, a channel beam splitter 120, photoelectric convertors 130-1 to 130-$n$ ($n$ is a positive integer indicating a channel number for signal light), electric filters 140-1 to 140-$n$, and a signal detection unit 150.

The signal light monitoring apparatus 100 receives monitor light split from an optical fiber by a beam splitter 200, judges whether signal light is present or absent for each channel being measured, and outputs the judgment result to an external apparatus 300.

If the optical filter 110 receives the monitor light split from the optical fiber by the beam splitter 200, the optical filter 110 performs filtering in a transmission range having, as a center frequency, a carrier frequency of each channel being judged as to whether signal light is present or absent (hereinafter referred to as "measurement object"), and outputs the obtained light to the channel beam splitter 120.

Upon receipt of the filtered monitor light, the channel beam splitter 120 splits the monitor light into n channels according to frequencies and outputs monitor light of i channels (i is a positive integer; 1≤i≤n) to the photoelectric convertor 130-$i$.

The photoelectric convertor 130-$i$ photoelectrically converts the monitor light output from the channel beam splitter 120 to generate an electrical monitor signal, and outputs the generated electrical monitor signal to the electric filter 140-$i$.

The electric filter 140-$i$ performs filtering on the electrical monitor signal output from the photoelectric convertor 130-$i$, and outputs the filtered electrical monitor signal to the signal detection unit 150.

The signal detection unit 150 judges, for each channel, whether signal light is present or absent based on the electrical monitor signal filtered by the electric filter 140-$i$, and outputs the judgment result to the external apparatus 300. For example, the signal detection unit 150 judges that the signal light is present if intensity of the electrical monitor signal (e.g., alternating current value) filtered by the electric filter 140-$i$ is equal to or more than a previously stored threshold, and judges that the signal light is absent if the intensity of the electrical monitor signal is less than the threshold.

The external apparatus 300 is, for example, a state monitoring server for monitoring a state of communication in a communication system. The external apparatus 300 displays or records the judgment result for presence/absence of the signal light output from the signal light monitoring apparatus 100. This enables a communication system manager to more rapidly specify causes and cope with these when the communication apparatus fails in the communication. For example, if it is judged that the signal light is absent, failure of an apparatus at a transmission side, disconnection of a communication line, or the like is considered a cause of communication failure. On the other hand, if it is judged that signal light is present, failure of an apparatus at a reception side, inclusion of an optical noise in the communication path, or the like is considered the cause of communication failure. Here, the communication system manager can identify failure causes and failure generation positions and more rapidly cope with these based on whether the signal light is present or absent.

Further, the photoelectric convertors 130-1 to 130-$n$, the electric filters 140-1 to 140-$n$, and the signal detection unit 150 constitute a signal presence/absence judgment unit. That is, first, the photoelectric convertors 130-1 to 130-$n$ output the electrical monitor signal indicating the intensity of the light filtered by the optical filter. Next, as will be described later, the electric filters 140-1 to 140-$n$ extract an electrical monitor signal at a specific frequency from the electrical monitor signal, and output an electrical monitor signal indicating the intensity of the light at the specific frequency. The signal detection unit 150 judges whether the signal is present or absent based on the intensity of the electrical monitor signal. Accordingly, the signal presence/absence judgment unit judges whether the signal is present or absent based on the intensity of the light filtered by the optical filter.

Next, filtering performed by the optical filter 110 will be described with reference to FIG. 2.

Figure 2:
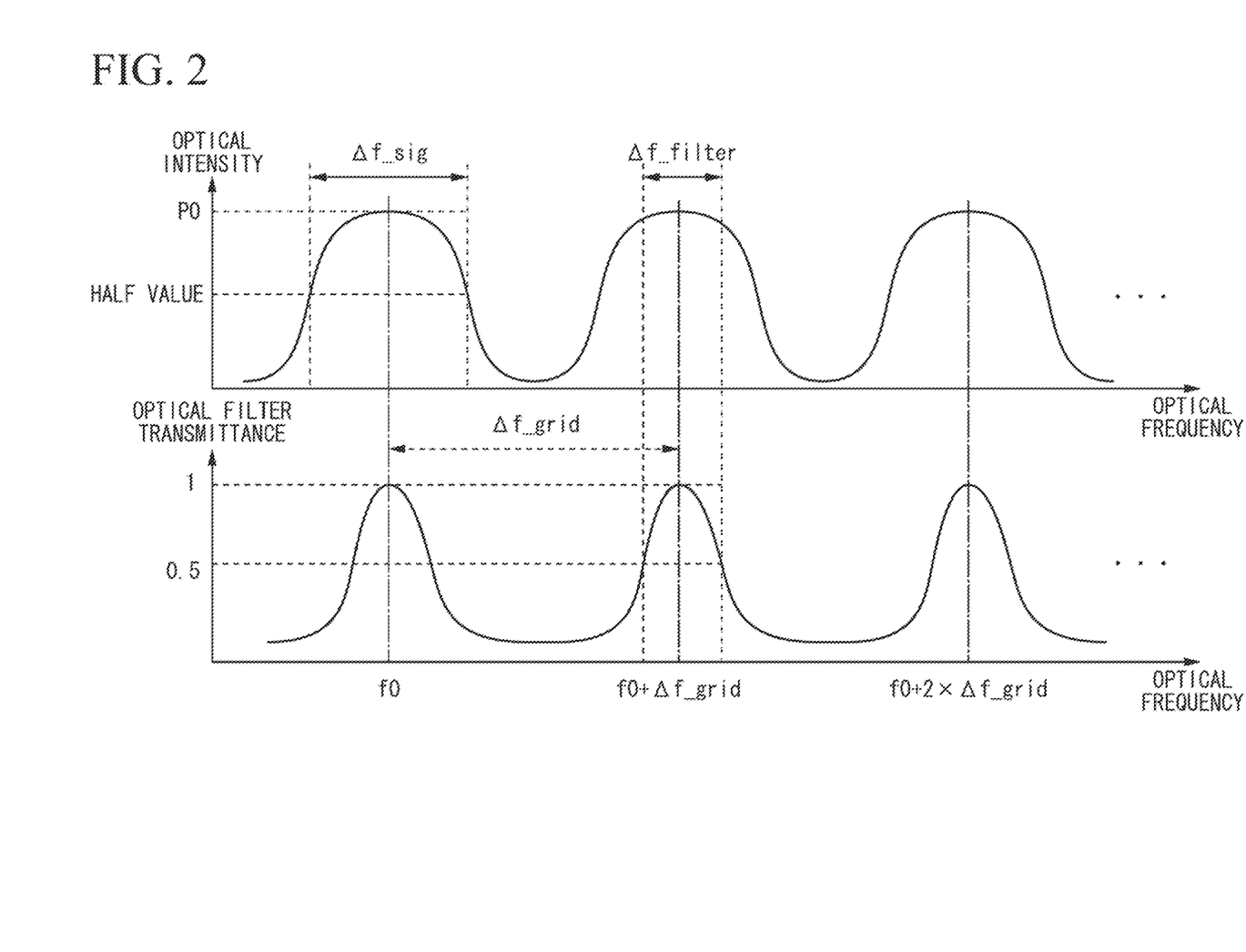
FIG. 2 is a diagram showing an example of a transmission range of an optical filter in the embodiment.

FIG. 2 is a diagram showing an example of a transmission range of the optical filter 110. In FIG. 2, carrier frequencies of carrier waves contained in signal light that is a measurement object of the signal light monitoring apparatus 100 are arranged at frequency intervals of f0, f0+Δf_grid, f0+2Δf_grid, . . . , Δf_grid. The carrier wave of each channel has a signal bandwidth having a full width at half maximum of Δf_sig. A full width at half maximum may be referred to as a half peak width.

On the other hand, the optical filter 110 has a transmission range having the carrier frequency of each carrier wave as a center and a full width at half maximum of Δf_filter. Accordingly, the optical filter 110 passes the carrier wave of each channel.

Since the optical filter 110 performs filtering as described above, an S/N ratio can be improved if signal light is contained in the monitor light input from the beam splitter 200. That is, as shown in FIG. 2, the signal light exhibits strong optical intensity near the carrier frequency and weak optical intensity at frequencies away from the carrier frequency. Meanwhile, white noise such as amplified spontaneous emission (ASE) noise is considered noise in optical communication (optical noise). The monitor light containing such white noise has an S/N ratio that is great near the carrier frequency and small at frequencies away from the carrier frequency. Here, the optical filter 110 selectively transmits light near the carrier frequency in order to extract a portion with a great S/N ratio from the monitor light.

Here, since the signal light exhibits strong optical intensity at frequencies closer to the carrier frequency, the S/N ratio increases as the transmission range of the optical filter 110 narrows. Since the signal light monitoring apparatus 100 is a device for judging whether a signal is present or absent and does not restore data, the signal light monitoring apparatus 100 can perform filtering on the monitor light beyond a degree allowing a communication symbol to be decoded from the signal light, that is, in a transmission range that is so narrow that information of the communication symbol is lost. Accordingly, the optical filter 110 can extract a portion having a particularly great S/N ratio.

Next, an experiment conducted by the inventor and filtering performed by the electric filters 140-1 to 140-$n$ will be described with reference to FIGS. 3 to 7. The inventor found from the experiment that an electrical monitor signal with a high S/N ratio at a frequency that is $(k/2^m)$ times the symbol rate (k and m are positive integers) is obtained by filtering and photoelectrically converting the light signal.

Figure 3:
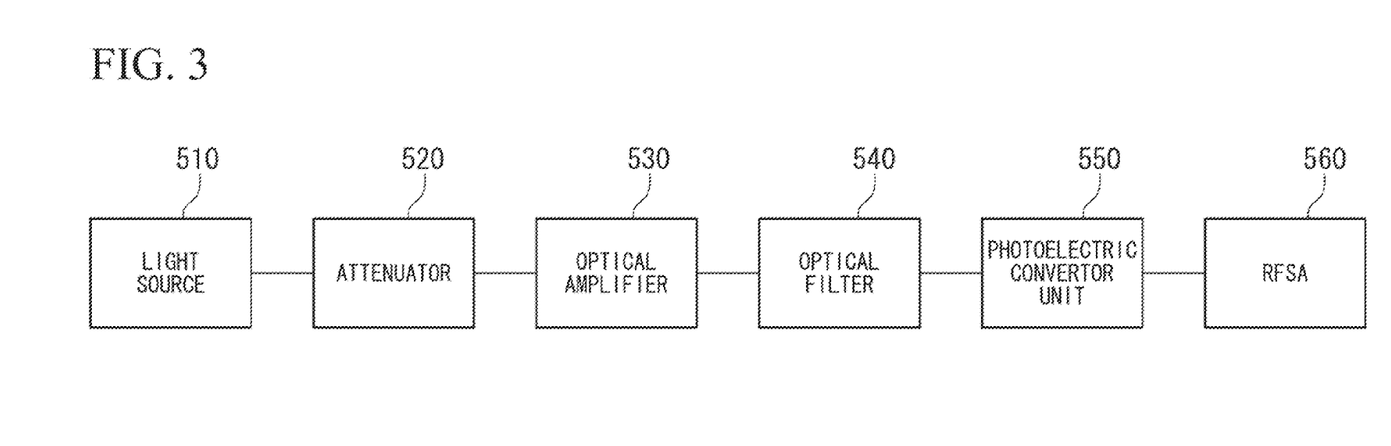
FIG. 3 is a configuration diagram showing a schematic configuration of an apparatus in an experiment conducted by the inventor.

FIG. 3 is a configuration diagram showing a schematic configuration of an apparatus in the experiment conducted by the inventor.

An experimental apparatus shown in FIG. 3 includes a light source 510, an attenuator 520, an optical amplifier 530, an optical filter 540, a photoelectric convertor unit 550, and a radio frequency spectrum analyzer (RFSA) 560.

The light source 510 is a light source for outputting a carrier wave of 88 channels from 191.75 terahertz (THz) to 196.1 THz at intervals of ITU-Grid 50 gigahertz (GHz). The light source 510 outputs signal light of 1 milliwatt per channel (1 mW/ch). Further, a signal bandwidth (a full width at half maximum of the signal light; Δf_sig in FIG. 2) is 10 GHz.

The attenuator 520 attenuates the input light signal by 20 decibels (dB). The optical amplifier 530 amplifies the input signal light by 20 decibels. The attenuator 520 and the optical amplifier 530 are devices for simulating a communication path, from which optical noise such as ASE noise is generated.

The optical filter 540 is a device configured to simulate the optical filter 110 and the channel beam splitter 120 in FIG. 1. The optical filter 540 is a Gaussian filter (a filter having a filter shape with a Gaussian function), and has an adjustable bandwidth. In the present experiment, a channel of 193.05 THz is a measurement object, and the optical filter 540 uses 193.05 THz as a center of a transmission area.

The photoelectric convertor unit 550 is a device for simulating the photoelectric convertor 130-$i$ of FIG. 1. The photoelectric convertor unit 550 is a PIN photodiode (PIN-PD) type photoelectric convertor capable of receiving a light signal in a 193.05 THz band. The photoelectric convertor unit 550 converts input light into an electrical monitor signal having a size according to the intensity of the input light. Light reception efficiency of the photodiode of the photoelectric convertor unit 550 is 1 ampere per watt (1 A/W), and a thermal noise is $1\times10^{12}$ ampere per root Hertz ($1\times10^{12}$ A/$\sqrt{Hz}$).

The high frequency spectrum analyzer 560 is a device used in place of the signal detection unit 150 of FIG. 1. The high frequency spectrum analyzer 560 displays a waveform in a frequency domain of the electrical monitor signal generated by the photoelectric convertor unit 550.

In this experimental apparatus, the inventor observed a waveform of the electrical monitor signal output by the photoelectric convertor unit 550 by outputting signal light from the light source 510 and variously adjusting the bandwidth of the optical filter 540, in which the symbol rate is 10 gigabits/sec (10 Gbps), a bit rate is also 10 gigabits/sec, and a modulation scheme is 2-DPSK (2-Differential Phase Shift Keying)

Figure 4:
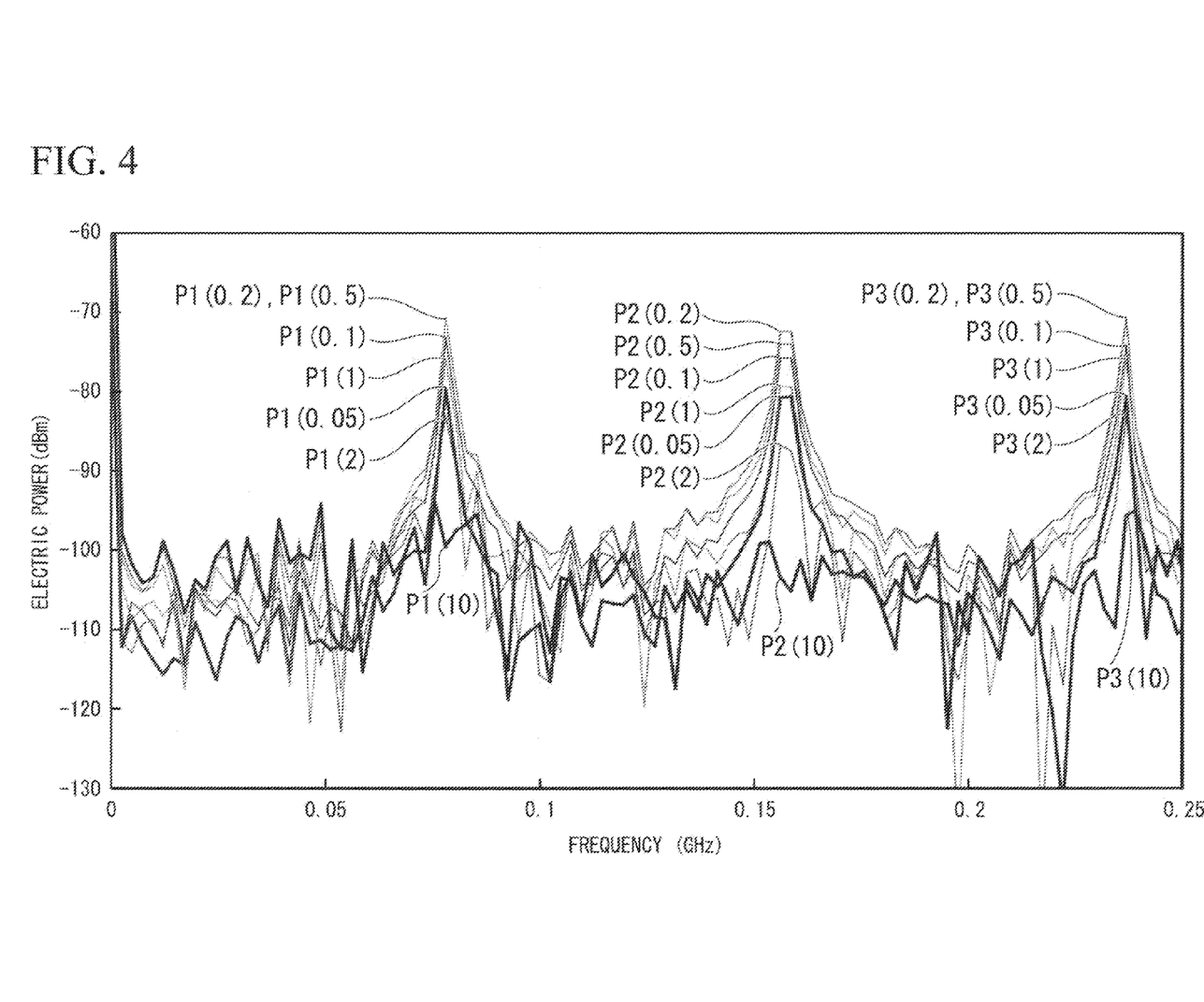
FIG. 4 is a graph showing a waveform obtained in the experiment.

FIG. 4 is a graph showing a waveform obtained in the experiment. In FIG. 4, a horizontal axis indicates a frequency, and a vertical axis indicates a size of each frequency component of an electrical monitor signal.

Further, a point P1($w$) ($w$ is any of 0.05, 0.1, 0.2, 0.5, 1, 2, and 10) indicates a size of the electrical monitor signal at a frequency of 78 MHz when a full width at half maximum (half peak width) of a transmittance of the optical filter 540 is set to $w$ times the full width at half maximum of the signal light (signal bandwidth) (hereinafter referred to simply as "the full width at half maximum of the optical filter 540 is set to $w$ times"). For example, a point P1(0.2) indicates the size of the electrical monitor signal at the frequency of 78 MHz when the full width at half maximum of the transmittance of the optical filter 540 is set to 2 gigahertz, which is 0.2 times the full width at half maximum of the signal light.

78 MHz corresponds to $(1/2^7)$ times 10 gigabits/sec, which is the symbol rate of the transmission signal.

Further, a point P2($w$) indicates the size of the electrical monitor signal at a frequency of 156 MHz when the full width at half maximum of the optical filter 540 is set to $w$ times. 156 MHz corresponds to $(1/2^6)$ times the symbol rate of the transmission signal.

Further, a point P3($w$) indicates the size of the electrical monitor signal at a frequency of 234 MHz when the full width at half maximum of the optical filter 540 is set to $w$ times. 156 MHz corresponds to $(3/2^7)$ times the symbol rate of the transmission signal.

Here, when the full width at half maximum $w$ of the optical filter 540 is set to any of 0.05, 0.1, 0.2, 0.5, 1, and 2 times, the peak of the electrical monitor signal is found at the points P1($w$), P2($w$), and P3($w$). On the other hand, when the full width at half maximum $w$ of the optical filter 540 is set to 10 times, no prominent peak is found.

When the full width at half maximum $w$ is equal to or greater than 0.5 times, the peak value increases as the full width at half maximum is set to be narrower. For example, a peak value when the full width at half maximum $w$ of the optical filter 540 is one time (e.g., the point P1(1)) is greater than that when the full width at half maximum $w$ of the optical filter 540 is twice (e.g., the point P1(1)), and the peak value when the full width at half maximum $w$ is 0.5 times is greater than that when the full width at half maximum $w$ is one time.

From this, the signal light may be considered to be distorted and the peak shown in FIG. 4 is generated since the optical filter 540 filters the signal light in a narrow transmission range.

That is, if the full width at half maximum of the optical filter 540 is set to 10 times, the transmission range of the optical filter 540 is sufficiently wide. Accordingly, the distortion is not substantially generated in the signal light and the peak is not generated. Meanwhile, if the full width at half maximum of the optical filter 540 is set to twice, a portion in the signal light away from 193.05 terahertz, which is a center frequency, is cut and the distortion is generated in the signal light when the signal light passes through the optical filter 540. This distortion may be considered to cause the peak shown in FIG. 4 in the photoelectrically converted electrical monitor signal.

When the full width at half maximum of the optical filter 540 is set to one time, the distortion of the signal light may also be considered to be greater and the peak value greater than that when the full width at half maximum of the optical filter 540 is set to twice.

Further, even when the full width at half maximum of the optical filter 540 is set to be narrower than 0.5 times, the peak value does not increase, and when the full width at half maximum is equal to or less than 0.1 times, the peak value decreases conversely. This may be considered to be caused by a transmission amount of the signal light being reduced due to the narrow transmission range of the optical filter 540. That is, if the transmission range of the optical filter 540 narrows, an amount of the signal light cut by the optical filter 540 increases and an amount of the signal light passing through the optical filter 540 decreases. For example, when the full width at half maximum of the optical filter 540 is set to 0.1 times, the distortion of the signal light may be considered to be greater than that when the full width at half maximum of the optical filter 540 is set to 0.2 times, but the peak value becomes small since the amount of the signal light passing through the optical filter 540 becomes small.

Figure 5:
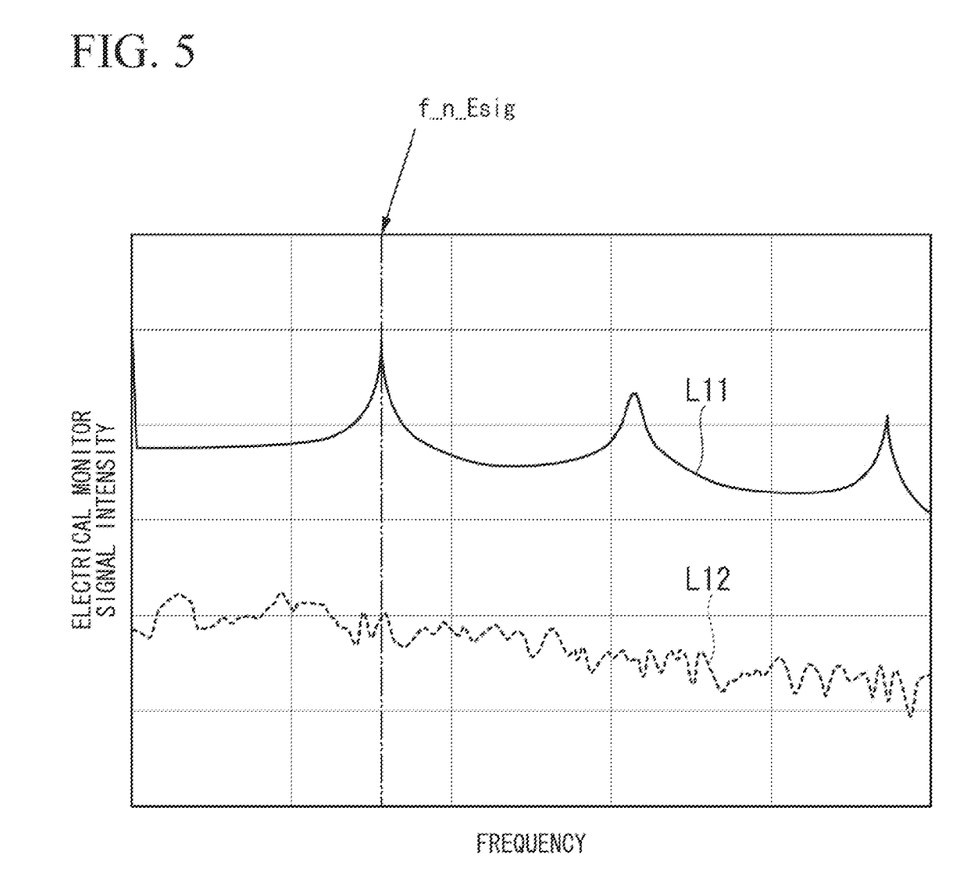
FIG. 5 is a diagram showing a difference between an electrical monitor signal when a light source outputs signal light and an electrical monitor signal when the light source does not output signal light in the experimental apparatus shown in FIG. 3.

FIG. 5 is a diagram showing a difference between an electrical monitor signal when the light source 510 outputs signal light and an electrical monitor signal when the light source 510 does not output signal light in the experimental apparatus shown in FIG. 3. In FIG. 5, a line L11 indicates the electrical monitor signal when the light source 510 outputs the signal light, and a line L12 indicates the electrical monitor signal when the light source 510 does not output the signal light.

If the full width at half maximum of the optical filter 540 is set to a small value, such as 0.2 times, and the light source 510 outputs the signal light, a peak is found from the electrical monitor signal, as described in FIG. 4. In FIG. 5, a peak of the electrical monitor signal indicated by the line L11 is found at a frequency f_n_Esig.

On the other hand, when the light source 510 does not output the signal light, no prominent peak is found from the electrical monitor signal. In FIG. 5, no prominent peak is found from the electrical monitor signal indicated by the line L12.

Here, when a size of the electrical monitor signal is measured at a frequency at which the peak of the electrical monitor signal is found, such as the frequency f_n_Esig in FIG. 5, a difference between the electrical monitor signal when the light source 510 outputs the signal light and the electrical monitor signal when the light source 510 does not output the signal light becomes great. Accordingly, it is possible to more accurately judge whether the signal light is present or absent even in an optically noisy environment.

The electric filter 140-$i$ in FIG. 1 is a filter for extracting an electrical monitor signal at a frequency at which the difference between the electrical monitor signals becomes great.

A low pass filter or a band pass filter may be used as the electric filter 140-$i$.

Figure 6:
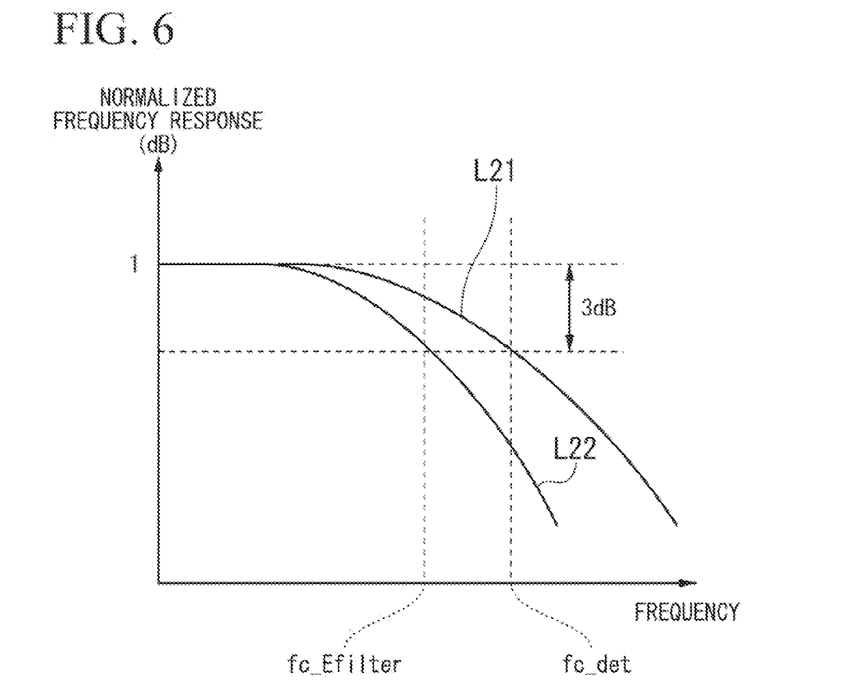
FIG. 6 is a diagram showing an example of a characteristic of an electric filter, which is a low pass filter.

FIG. 6 is a diagram showing an example of a characteristic of the electric filter 140-$i$ that is a low pass filter.

In FIG. 6, a line L22 indicates an example of the transmittance of the electric filter 140-$i$. The transmittance of the electric filter 140-$i$ is high at a side of a low frequency and low at a side of a high frequency. The transmittance is 0.5 (half) at a frequency of fc_Efilter.

In order to more accurately judge whether the signal light is present or absent, it is desirable for the electric filter 140-$i$ to have a high transmittance at a frequency that is a measurement object, if possible. For example, a low pass filter having a transmittance higher than 0.5 at the frequency that is a measurement object may be used as the electric filter 140-$i$.

Meanwhile, it is desirable for the electric filter 140-$i$ to have a low transmittance at a frequency higher than the frequency that is a measurement object, if possible. Accordingly, a low pass filter having a sharply falling transmittance near the frequency that is a measurement object may be used as the electric filter 140-$i$.

Since the electric filter 140-$i$ has a low transmittance at a frequency higher than the frequency that is a measurement object, it is possible to achieve an improved S/N ratio by cutting the electrical monitor signal at frequencies other than the frequency corresponding to the peak of the electrical monitor signal.

Further, it is desirable for the photoelectric convertor 130-$i$ to exhibit a higher response at the frequency that is a measurement object, if possible, similar to the electric filter 140-$i$.

In FIG. 6, a line L21 indicates an example of the response of the photoelectric convertor 130-$i$ (intensity of an output electrical signal relative to input light having certain intensity). The response of the photoelectric convertor 130-$i$ is 0.5 (half) at a frequency fc_det. Hereinafter, the frequency at which the response becomes 0.5 is referred to as a "half peak frequency."

For example, a photoelectric convertor having the half peak frequency fc_det that is equal to or more than twice the frequency that is a measurement object may be used as the photoelectric convertor 130-$i$.

Further, the photoelectric convertor 130-$i$ may have a wide response band, but a photoelectric convertor having a relatively narrow response band is inexpensive. Use of the latter can reduce manufacturing cost of the signal light monitoring apparatus 100. For example, a photoelectric convertor having a half peak frequency equal to or less than about 1 GHz is used as the photoelectric convertor 130-$i$.

Further, in the experiment conducted by the applicant, the peak of the electrical monitor signal appears at a position of a frequency that is ($k/2^m$) times the symbol rate of a transmission signal (k and m are positive integers). In the example of FIG. 4, when the symbol rate of the transmission signal is 10 Gbit/sec, a peak is found at a position of 78 MHz corresponding to ($1/2^7$) times the symbol rate, a position of 156 MHz corresponding to ($1/2^6$) times, and a position of 156 MHz corresponding to (3/2) times.

Here, the frequency that is a measurement object may be considered to be ($k/2^m$) times the symbol rate of the communication signal and a low pass filter that extracts an electrical signal having a frequency equal to or less than ($k/2^m$) times the symbol rate of the communication signal to be used as the electric filter 140-$i$.

Figure 7:
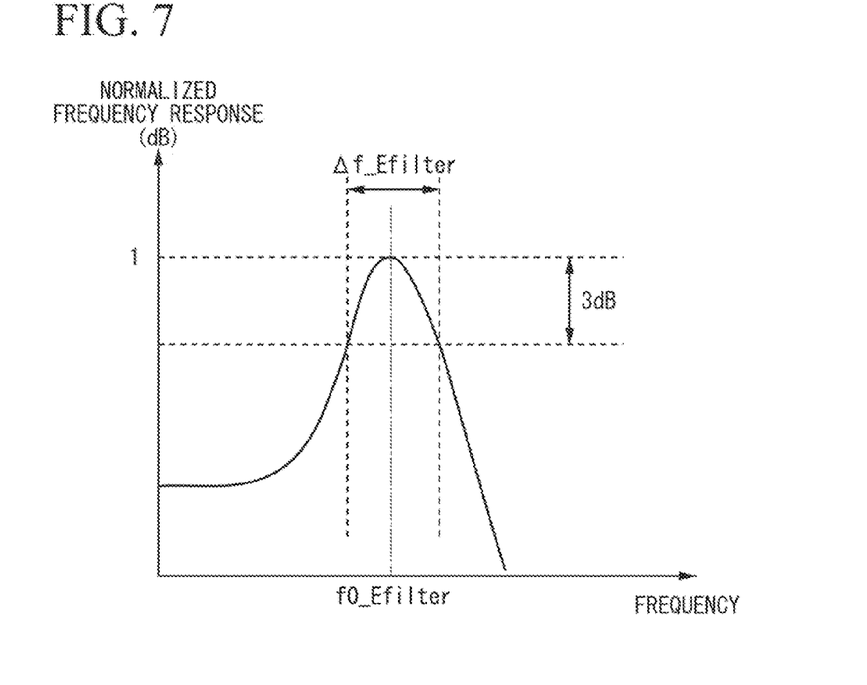
FIG. 7 is a diagram showing an example of a characteristic of an electric filter, which is a band pass filter.

FIG. 7 is a diagram showing an example of a characteristic of the electric filter 140-$i$, which is a band pass filter. In FIG. 7, the electric filter 140-$i$ has a full width at half maximum of $\Delta$f_Efilter having a frequency f0_Efilter as a center frequency.

In order to extract the electrical monitor signal at the frequency that is a measurement object, a band pass filter having a center frequency f0_Efilter coinciding with the frequency that is a measurement object is used as the electric filter 140-$i$. Since the band pass filter is used as the electric filter 140-$i$, it is possible to cut an electrical monitor signal at a side of a low frequency, in addition to an electrical monitor signal at a side of a high frequency higher than the frequency that is a measurement object, and increase the S/N ratio compared to use of a low pass filter.

Further, if the frequency that is a measurement object is ($k/2^m$) times the symbol rate of the communication signal as described above, a band pass filter having a frequency that is ($k/2^m$) times the symbol rate of the communication signal that is a center frequency is used as the electric filter 140-$i$.

Next, a transmission range that the optical filter 110 must have will be described with reference to FIG. 8.

Figure 8:
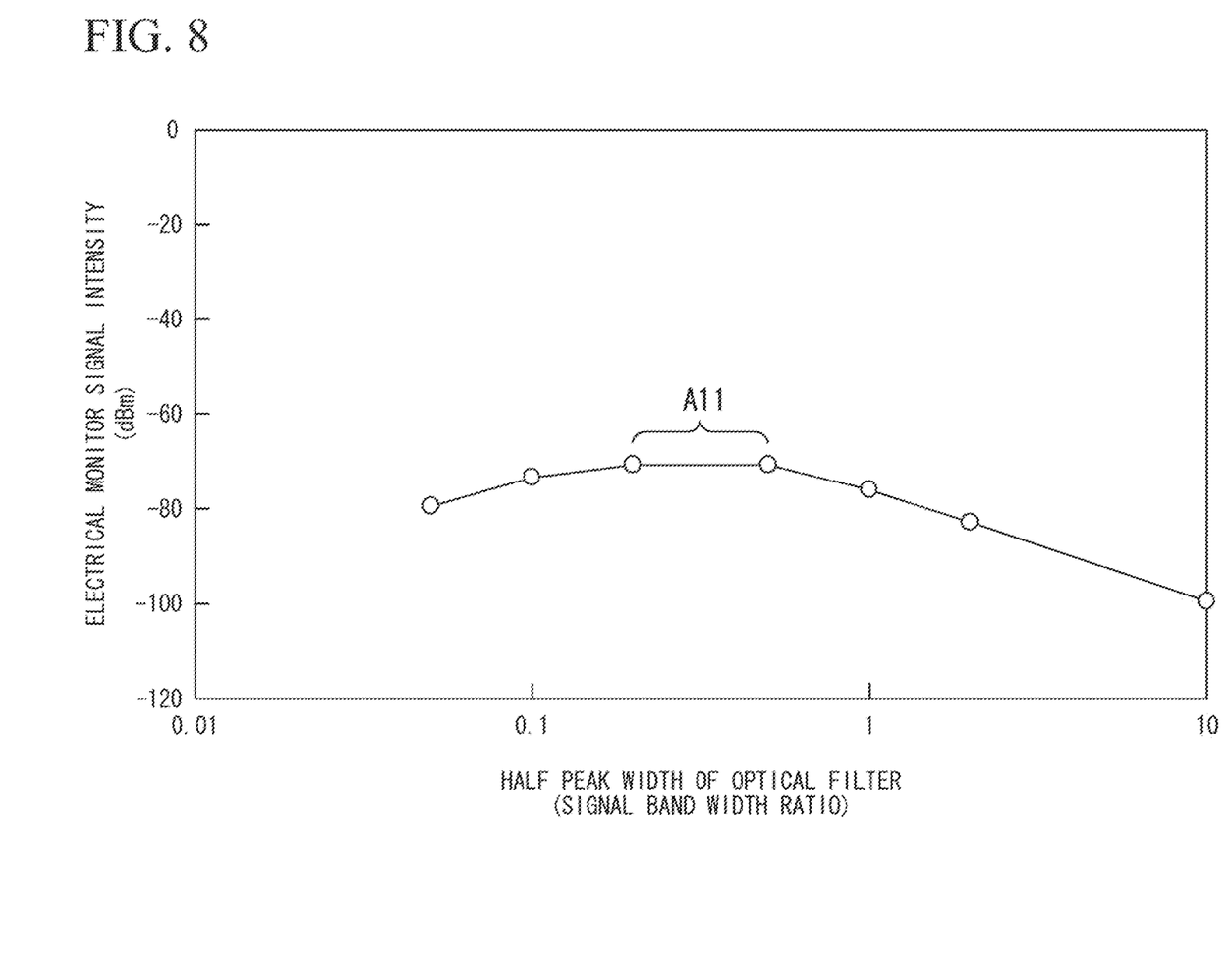
FIG. 8 is a diagram showing a relationship between a full width at half maximum (a half peak width) of an optical filter and a size of a peak value of an electrical monitor signal in the experiment described using FIGS. 3 and 4.

FIG. 8 is a diagram showing a relationship between the full width at half maximum of the optical filter 540 and a size of the peak value of the electrical monitor signal in the experiment described using FIGS. 3 and 4. In FIG. 8, a horizontal axis indicates the full width at half maximum of the optical filter 540 as a ratio to the signal bandwidth, and a vertical axis indicates intensity of the electrical monitor signal output by the photoelectric convertor unit 550. The points P1(0.05) to P1(10) of FIG. 4 are plotted.

Referring to FIG. 8, if the full width at half maximum of the optical filter 540 is equal to or more than 0.5 times, the peak value increases as the full width at half maximum decreases. Meanwhile, if the full width at half maximum of the optical filter 540 is equal to or less than 0.2 times, the peak value decreases as the full width at half maximum decreases. The greatest peak appears in an area A11 of FIG. 8 in which the full width at half maximum of the optical filter 540 ranges from 0.2 times to 0.5 times.

Here, the full width at half maximum of the transmittance of the optical filter 110 in FIG. 1 may be considered to range from 0.5 times to 0.2 times the signal bandwidth. If the peak of the electrical monitor signal described above results from distortion of the signal light caused by the optical filter, as the optical filter 110 performs filtering in the same transmission range as that of the optical filter 540 in the experiment, the same distortion as in the experiment may be expected to be generated in the signal light transmitting the optical filter 110 and the same peak as in the experiment may be expected to be generated in the electrical monitor signal output by the photoelectric convertors 130-1 to 130-$n$. Since the electric filters 140-1 to 140-$n$ extract this peak and the signal detection unit 150 judges whether signal light is present or absent based on the electrical monitor signal in the peak portion, a more accurate judgment as to whether the signal light is present or absent may be expected.

As described above, since the optical filter 110 extracts light in a band centered on a carrier frequency of signal light that is a measurement object from the monitor light input from the beam splitter 200, an S/N ratio of the monitor light increases. Since the signal presence/absence judgment unit is configured of the photoelectric convertors 130-1 to 130-$n$, the electric filters 140-1 to 140-$n$, and the signal detection unit 150 judges whether the signal light is present or absent based on the light for which the S/N ratio has been improved by the optical filter 110, it is possible to more accurately judge whether the signal light is present or absent even in an optically noisy environment.

Further, the filtering in the optical filter 110 causes a peak in a portion of a frequency lower than the symbol rate in the electrical monitor signal output by the photoelectric convertors 130-1 to 130-$n$. Since the signal light monitoring apparatus 100 judges whether signal light is present or absent based on this peak, it is possible to more accurately judge whether the signal light is present or absent even in an optically noisy environment.

Further, the signal light monitoring apparatus 100 may include photoelectric convertors having a response band lower than the symbol rate as the photoelectric convertors 130-1 to 130-$n$, thereby reducing the manufacturing cost of the signal light monitoring apparatus 100.

Similarly, electric filters operating at a relatively low frequency may be included as the electric filters 140-1 to 140-$n$, thereby reducing the manufacturing cost of the signal light monitoring apparatus 100.

Similarly, a signal detection unit 150 for detecting an electrical signal having a relatively low frequency may be included as the signal detection unit 150, thereby reducing the manufacturing cost of the signal light monitoring apparatus 100. For example, a rectifying circuit capable of rectifying only an electrical signal having a relatively low frequency (converting the electrical signal into current), and an amperemeter for measuring the current rectified by the rectifier circuit may be included as the signal detection unit, making an expensive rectifier circuit for rectifying an electrical signal having a high frequency unnecessary.

Further, since the optical filter 110 has the full width at half maximum of a transmittance ranging from 20 percent of the full width at half maximum of the signal light that is a measurement object to a half of the full width at half maximum, a greater peak is generated in the electrical monitor signal. Accordingly, the signal light monitoring apparatus more accurately judges whether the signal light is present or absent.

Also, it is possible to increase the S/N ratio by extracting a peak portion of the electrical monitor signal using, as the electric filters 140-1 to 140-$n$, band pass filters having a frequency that is $(k/2^m)$ times the symbol rate of the communication signal that is a center frequency. Accordingly, the signal light monitoring apparatus more accurately judges whether the signal light is present or absent.

Further, the signal light monitoring apparatus 100 can be manufactured at low cost since the signal light monitoring apparatus 100 need not include a decoding circuit or the like.

Alternatively, the signal light monitoring apparatus 100 may judge whether the signal light is present or absent by comparing an electrical monitor signal at a frequency at which the peak of the electrical monitor signal is obtained, like the frequency f_n_Esig in FIG. 5, and an electrical monitor signal at frequencies other than the frequency at which the peak is obtained.

In this case, when the signal light is present, the signal light monitoring apparatus 100 can detect that there is a great difference in the intensity of the electrical monitor signal between the frequency at which the peak is obtained and the frequencies other than the frequency at which the peak is obtained. On the other hand, when the signal light is absent, the signal light monitoring apparatus 100 can detect that there is no substantial difference in the intensity of the electrical monitor signal between the frequency at which the peak is obtained and the frequencies other than the frequency at which the peak is obtained.

Here, if the signal light monitoring apparatus 100 judges whether the signal light is present or absent based on only the electrical monitor signal at the frequency at which the electrical monitor signal peak is obtained, an optical noise temporarily increases. If the intensity of the electrical monitor signal becomes strong due to the optical noise, the signal light monitoring apparatus 100 may erroneously judge that the signal light is present despite the absence of the signal light. In this case, it is possible to prevent the erroneous judgment when the optical noise temporarily increases by the signal light monitoring apparatus 100 comparing the electrical monitor signal at the frequency at which the peak is obtained with the electrical monitor signal at the frequencies other than the frequency at which the peak is obtained.

A scheme of modulating the signal light monitored by the signal light monitoring apparatus 100 is not limited to 2-DPSK in the description of the experiment. It is possible to monitor signal light conforming to various modulation schemes in which the signal light is distorted due to filtering in the optical filter 110, such as other phase modulation schemes, intensity modulation (amplitude modulation) schemes or frequency modulation schemes.

Further, the type of optical filter 110 is not limited to the Gaussian filter in the description of the experiment, and various types of optical filters causing distortion in signal light may be used.

Alternatively, the signal light monitoring apparatus 100 may measure they intensity of the electrical monitor signal plural times and may judge whether signal light is present or absent based on an average of the measured values. For example, the signal light monitoring apparatus 100 may judge whether signal light is present or absent at a high frequency signal (an RF signal) of 78 MHz or more, for a signal transmitted at a symbol rate of 10 gigabits or more. In this case, the signal light monitoring apparatus 100, can judge whether a signal is present or absent at the highest speed, $1/78$ MHz=13 nanoseconds (ns).

In order to prevent an erroneous judgment caused by an instantaneous malfunction of the signal light monitoring apparatus 100 or an erroneous judgment caused by instantaneous noise light contained in the monitor light, the signal light monitoring apparatus 100 performs a sampling process on monitor light input continuously in a time direction (hereinafter referred to as "continuously") from the beam splitter 200, for example, about 100 times, measures the intensities of the electrical monitor signals generated by the electric filters 140-1 to 140-$n$, and judges whether the signal light is present or absent based on an average of the measured values.

Specifically, the optical filter 110 continuously filters the monitor light input from the beam splitter 200, the channel beam splitter 120 continuously splits the monitor light filtered by the optical filter 110, the photoelectric convertors 130-1 to 130-$n$ continuously perform photoelectric conversion on the monitor light split by the channel beam splitter 120 to generate an electrical monitor signal, and the electric filters 140-1 to 140-$n$ continuously filter the electrical monitor signal generated by the photoelectric convertors 130-1 to 130-$n$. Accordingly, the electric filters 140-1 to 140-$n$ continuously output the filtered electrical monitor signal. Here, the electric filters 140-1 to 140-$n$ extract a signal at 78 MHz or more from the electrical monitor signal through a filtering process. The signal detection unit 150 performs sampling on the filtered electrical monitor signal output from the electric filters 140-1 to 140-$n$, for example, 100 times in a period of 13 nanoseconds as described above, measures the intensity of the electrical monitor signal at each sampling, averages the result of 100 measurements, and judges whether the signal light is present or absent based on the obtained average.

Since the judgment is made based on a plurality of monitor light sampling results as described above, it is possible to prevent an erroneous judgment caused by an instantaneous malfunction of the signal light monitoring apparatus 100 or an erroneous judgment caused by instantaneous noise light contained in the monitor light.

If the signal light monitoring apparatus 100 judges whether the signal light is present or absent by performing the 100 sampling processes, the signal light monitoring apparatus 100 has a signal detection time of 1300 nanoseconds (=13 nanoseconds×100), which is shortest. The signal light monitoring apparatus 100 can very rapidly judge whether the signal light is present or absent.

Alternatively, if the signal light monitoring apparatus 100 makes the judgment in 1 millisecond (ms), the signal light monitoring apparatus 100 can make the judgment based on the result of 76,900 (=1 millisecond/13 nanoseconds) monitor light sampling processes and make an accurate judgment.

Further, a configuration of the signal light monitoring apparatus is not limited to the configuration shown in FIG. 1.

Figure 9:
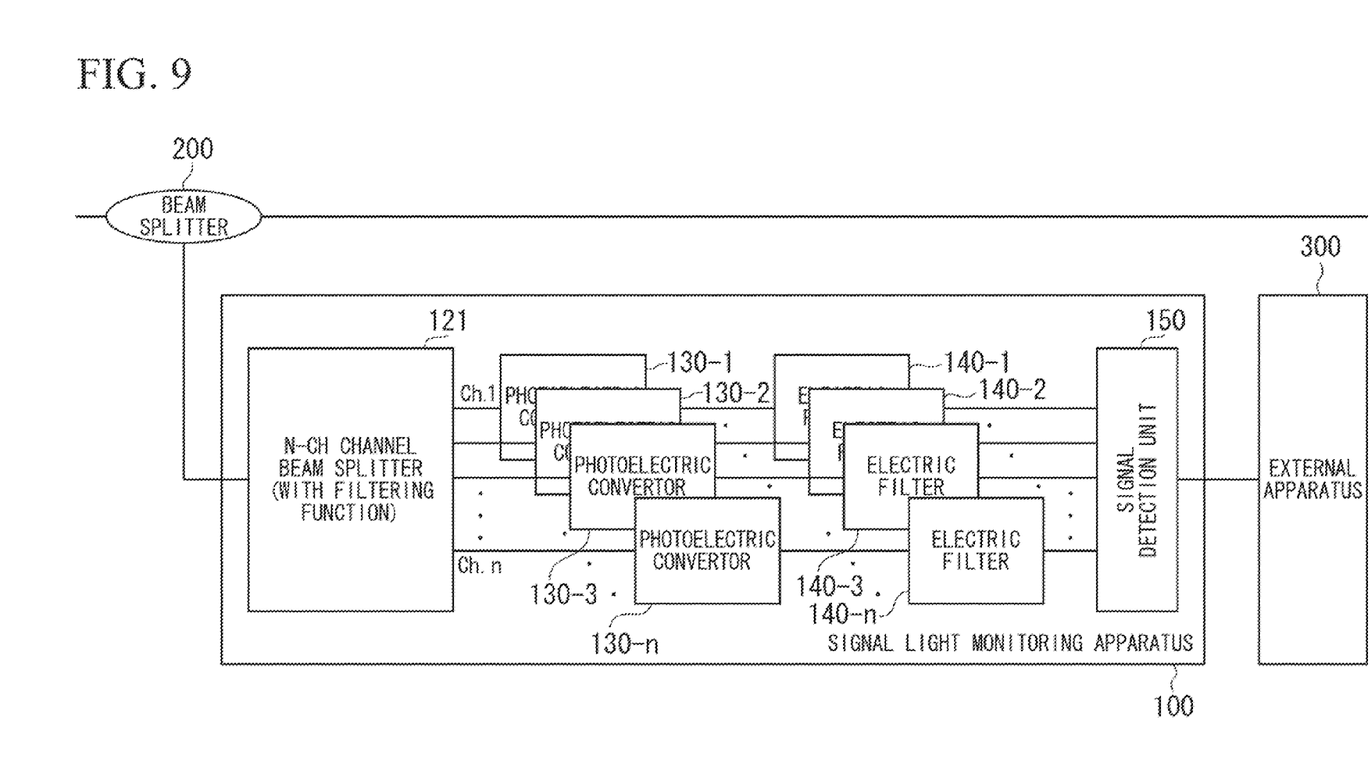
FIG. 9 is a configuration diagram showing a schematic configuration in a variant of the signal light monitoring apparatus.

FIG. 9 is a configuration diagram showing a schematic configuration in a variant of the signal light monitoring apparatus. In FIG. 9, the signal light monitoring apparatus 101 includes a channel beam splitter 121, photoelectric convertors 130-1 to 130-$n$, electric filters 140-1 to 140-$n$, and a signal detection unit 150. In FIG. 9, units having the same functions as those in FIG. 1 are assigned the same reference numerals (130-1 to 130-$n$, 140-1 to 140-$n$, 150, 200, and 300), and a description thereof will be omitted.

The signal light monitoring apparatus 101 differs from the signal light monitoring apparatus 100 in FIG. 1 in that the signal light monitoring apparatus 101 includes a channel beam splitter 121 instead of the optical filter 110 and the channel beam splitter 120 in FIG. 1.

The channel beam splitter 121 is a channel beam splitter having a filtering function.

Figure 10:
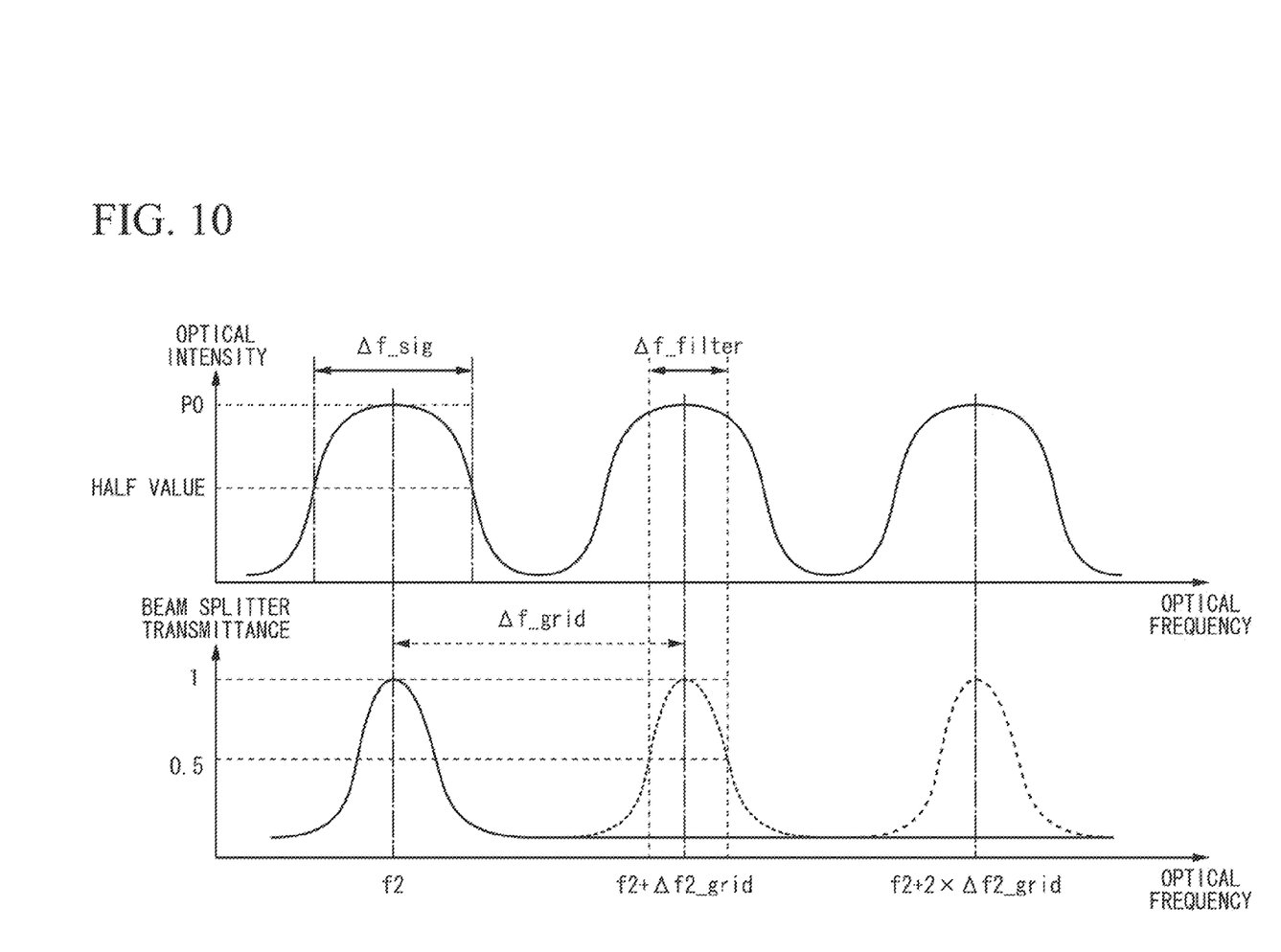
FIG. 10 is a diagram showing an example of a transmission range in a filtering function of a channel beam splitter in the variant.

FIG. 10 is a diagram showing an example of a transmission range in the filtering function of the channel beam splitter 121. In FIG. 10, carrier frequencies of carrier waves contained in signal light that is a measurement object of the signal light monitoring apparatus 101 are arranged at frequency intervals of f0, f0+Δf_grid, f0+2Δf_grid, . . . , Δf_grid, similar to those in FIG. 2. A carrier wave of each channel has a signal bandwidth having a full width at half maximum of Δf_sig.

On the other hand, the channel beam splitter 121 has, for each channel, a transmission range having the carrier frequency of the carrier wave as a center and a full width at half maximum of Δf_filter. Accordingly, the channel beam splitter 121 divides the monitor light for each channel, like the channel beam splitter 120 in FIG. 1, performs filtering on the monitor light, like the filter 110 of FIG. 1, and outputs the filtered monitor light to the photoelectric convertor 130-$i$ according to the frequency.

The channel beam splitter 121 is configured of, for example, a channel beam splitter for splitting input monitor light into n lights, and n optical filters for respective channels.

Thus, since the channel beam splitter 121 performs filtering and splitting, the signal light monitoring apparatus 101 can more accurately judge whether the signal light is present or absent even in an optically noisy environment, similar to the signal light monitoring apparatus 100 in FIG. 1.

What is claimed is:

1. A signal light monitoring apparatus comprising:
   an optical filter configured to extract light in a band having a carrier frequency of signal light, the signal light being a measurement object, as a center frequency from input light; and
   a signal presence/absence judgment unit configured to judge whether a signal is present or absent based on intensity of the light extracted by the optical filter,
   wherein the signal presence/absence judgment unit comprises:
   a photoelectric convertor configured to convert the light extracted by the optical filter into an electrical signal indicating the intensity of the light;
   an electric filter configured to extract an electrical signal at a frequency lower than a symbol rate of a communication signal from the electrical signal converted by the photoelectric convertor; and
   a signal detection unit configured to judge whether signal light is present or absent based on the intensity of the light indicated by the electrical signal extracted by the electric filter.

2. The signal light monitoring apparatus according to claim 1, wherein the optical filter has the full width at half maximum of a transmittance equal to or less than a full width at half maximum of the signal light that is the measurement object.

3. The signal light monitoring apparatus according to claim 1, wherein the optical filter has a full width at half maximum of a transmittance and the full width at half maximum of the transmittance is equal to or more than 20 percent of a full width at half maximum of the signal light that is the measurement object.

4. The signal light monitoring apparatus according to claim 1, wherein the electric filter is a low pass filter for extracting an electrical signal at a frequency that is equal to or less than $(k/2^m)$ times the symbol rate of the communication signal, where k and m are positive integers.

5. The signal light monitoring apparatus according to claim 1, wherein the electric filter is a band pass filter having a frequency that is $(k/2^m)$ times the symbol rate of the communication signal as a center frequency, in which k and m are positive integers.

6. The signal light monitoring apparatus according to claim 1, wherein the signal light that is a measurement object is a phase-modulated signal light.

7. The signal light monitoring apparatus according to claim 1, wherein the signal detection unit judges whether signal light is present or absent based on an average of intensities of light indicated by the electrical signal at plural times extracted by the electric filter.

8. The signal light monitoring apparatus according to claim 7, wherein the electric filter extracts the electrical signal having a frequency equal to or more than 78 MHz.

9. A signal light monitoring method for a signal light monitoring apparatus, the method comprising:
   an optical filtering step of extracting, by an optical filter, light in a band having a carrier frequency of signal light, which is a measurement object, as a center frequency from input light; and
   a signal presence/absence judgment step of judging, by a signal presence/absence judgment unit, whether a signal is present or absent based on intensity of the light extracted by the optical filter, wherein the signal presence/absence judgment unit comprises:
a photoelectric convertor configured to convert the light extracted by the optical filter into an electrical signal indicating the intensity of the light;
an electric filter configured to extract an electrical signal at a frequency lower than a symbol rate of a communication signal from the electrical signal converted by the photoelectric convertor; and
a signal detection unit configured to judge whether signal light is present or absent based on the intensity of the light indicated by the electrical signal extracted by the electric filter.

* * * * *